United States Patent [19]

Bernasconi

[11] Patent Number: 5,751,326

[45] Date of Patent: May 12, 1998

[54] COLOR PRINTING PROCESS AND PRODUCT

[75] Inventor: Matthew Bernasconi, Balmain, Australia

[73] Assignee: Opaltone International Limited, Balmain, Australia

[21] Appl. No.: 718,496

[22] PCT Filed: Apr. 5, 1995

[86] PCT No.: PCT/AU95/00192

§ 371 Date: Oct. 1, 1996

§ 102(e) Date: Oct. 1, 1996

[87] PCT Pub. No.: WO95/27231

PCT Pub. Date: Oct. 12, 1995

[30] Foreign Application Priority Data

Apr. 5, 1994 [AU] Australia ............................. PM4814

[51] Int. Cl.$^6$ ........................................................ B41J 2/47
[52] U.S. Cl. ............................ 347/115; 247/251; 247/232
[58] Field of Search ........................... 347/232, 115, 347/131, 240, 251, 254, 116, 118; 358/298; 348/386, 390, 391, 393; 395/107, 109

[56] References Cited

U.S. PATENT DOCUMENTS

| | | |
|---|---|---|
| 4,613,897 | 9/1986 | Stansfield. |
| 4,614,967 | 9/1986 | Sayanagi. |
| 4,774,567 | 9/1988 | Stansfield et al.. |
| 5,099,260 | 3/1992 | Sato et al. ............................... 347/118 |
| 5,130,786 | 7/1992 | Murata et al. ........................... 348/390 |

*Primary Examiner*—Mark J. Reinhart
*Attorney, Agent, or Firm*—Whitham, Curtis & Whitham

[57] ABSTRACT

A seven color separation process is provided in which, as well as the conventional Cyan, Magenta, Yellow and Black (CMYK) separations traditionally used in the four color printing process, additional Red, Green and Blue (RGB) separations are produced on a conventional scanner. The additional separations are produced using the Cyan, Magenta and Yellow channels of the scanner to measure Red, Green and Blue absorption characteristics of the source and to compensate the measured densities such that the separations represent a range of print densities from 0.0 D to 2.0 D corresponding to densities in the source in the range 1.0 D to 3.0 D. The transfer duration is also compensated for the compression which takes place in the preparation of the CMYK separations.

24 Claims, 8 Drawing Sheets

RGB SEPARATIONS (~ = N/A)

| "RGB" | R IN | R OUT | Y IN | Y OUT | G IN | G OUT | C IN | C OUT | V IN | V OUT | M IN | M OUT |
|---|---|---|---|---|---|---|---|---|---|---|---|---|
| (B) Y | Y 3.00 M 3.00 C 1.80 | 1% ~ ~ | Y 2.00 M 1.00 C 1.00 | 1% ~ ~ | Y 3.00 M 1.80 C 3.00 | 1% ~ ~ | Y 0.50 M 1.00 C 2.00 | 1% ~ ~ | Y 0.50 M 1.00 C 1.00 | 1% ~ ~ | Y 0.50 M 2.00 C 1.00 | 1% ~ ~ |
| (G) M | Y 3.00 M 3.00 C 1.80 | ~ 1% ~ | Y 2.00 M 0.50 C 1.00 | ~ 1% ~ | Y 1.00 M 0.50 C 1.00 | ~ 1% ~ | Y 1.00 M 0.50 C 2.00 | ~ 1% ~ | Y 1.80 M 3.00 C 3.00 | ~ 1% ~ | Y 1.00 M 2.00 C 1.00 | ~ 1% ~ |
| (R) C | Y 1.00 M 1.00 C 0.50 | ~ ~ 1% | Y 3.00 M 2.00 C 0.70 | ~ ~ 1% | Y 3.00 M 1.80 C 3.00 | ~ ~ 1% | Y 1.00 M 1.00 C 2.00 | ~ ~ 1% | Y 1.80 M 3.00 C 3.00 | ~ ~ 1% | Y 1.00 M 2.00 C 0.50 | ~ ~ 1% |

FIG. 8

CMY SEPARATIONS (~ = N/A)

| "CMY" | R IN | R OUT | Y IN | Y OUT | G IN | G OUT | C IN | C OUT | V IN | V OUT | M IN | M OUT |
|---|---|---|---|---|---|---|---|---|---|---|---|---|
| (C)Y | Y 3.00<br>M 3.00<br>C 1.80 | 1%<br>~<br>~ | Y 2.00<br>M 1.00<br>C 1.00 | 1%<br>~<br>~ | Y 3.00<br>M 1.80<br>C 3.00 | 1%<br>~<br>~ | Y 0.30<br>M 0.30<br>C 1.00 | 1%<br>~<br>~ | Y 0.50<br>M 1.00<br>C 1.00 | 1%<br>~<br>~ | Y 0.50<br>M 2.00<br>C 1.00 | 1%<br>~<br>~ |
| (Y)M | Y 3.00<br>M 2.00<br>C 0.70 | ~<br>1%<br>~ | Y 1.00<br>M 0.30<br>C 0.30 | ~<br>1%<br>~ | Y 1.00<br>M 0.50<br>C 1.00 | ~<br>1%<br>~ | Y 1.00<br>M 0.50<br>C 2.00 | ~<br>1%<br>~ | Y 1.80<br>M 3.00<br>C 3.00 | ~<br>1%<br>~ | Y 1.00<br>M 2.00<br>C 1.00 | ~<br>1%<br>~ |
| (M)C | Y 1.00<br>M 1.00<br>C 0.50 | ~<br>~<br>1% | Y 3.00<br>M 2.00<br>C 0.70 | ~<br>~<br>1% | Y 3.00<br>M 1.80<br>C 3.00 | ~<br>~<br>1% | Y 1.00<br>M 1.00<br>C 2.00 | ~<br>~<br>1% | Y 1.80<br>M 3.00<br>C 3.00 | ~<br>~<br>1% | Y 0.30<br>M 1.00<br>C 0.30 | ~<br>~<br>1% |

FIG. 9

COLOR PRINTING PROCESS AND PRODUCT

INTRODUCTION

This invention relates generally to the art of colour printing, and in particular, to a process of automatic colour separation whereby an extended print density range may be achieved.

BACKGROUND OF THE INVENTION

Current methods of colour separation for colour printing involve the use of four colours to reproduce an original colour print or transparency. The standard four colours used are cyan, magenta, yellow and black (CMYK).

Such methods of printing have been in operation since the early part of the twentieth century and have permitted the reproduction on paper of an original colour image, although with limited colour range and saturation for matching colours in the reproduction to the original.

Unfortunately, saturated colours such as deep reds, greens and blues cannot be reproduced satisfactorily due to the limited print range of four colour process.

In recent years, there has been a strong demand for up to seven colour separations, in order to reproduce as closely as possible the colours in the original. This is a time-consuming task in which originals are scanned in the traditional CMYK method on a colour separation scanner.

Electronic colour data generated is then sent to a colour retouching system and colour masked to "create" additional special colours, ie. red, green and blue, to produce seven colour separations.

This process relies heavily upon the skill of the operator and the power of the colour retouching system to interpret the amount of colour required in each particular area of the new colour separations, to match closely to the colours in the original. It is not uncommon to make several attempts at matching the colours in the original during the course of this process, which involves intensive use of labour and materials.

SUMMARY OF THE INVENTION

According to a first aspect, the present invention provides a method of producing colour separations for a printing process wherein an image source is scanned one or more times to produce a plurality of data channels each of which provides a representation of one colour separation of the image source, the data provided by each channel being restricted to represent a printable tone density range, and the channels being separated into two groups, a first providing separation data representing a base image and comprising a compressed representation of the density range of the image source, and the second providing separation data representing a saturation image and substantially comprising a representation of the density range data lost from the first data set as a result of tone compression to a printable density range.

According to a second aspect the present invention provides a method of producing colour separations for a printing process comprising the steps of:

(a) scanning an image source with a scanner having a conventional set of scanning parameters to produce data representing a first set of colour separations of the image, each having a printable density range, the separations being capable of reproducing the image with a tone density range within a printable density range;

(b) reprogramming the scanner to alter the scanning parameters to identify saturated colours in the image source;

(c) scanning the image source to produce a second set of data representing a second set of colour separations of the image also having a printable density range and carrying saturation colour information not recorded in the first set of data; and (d) preparing a set of colour separations from the first and second sets of data.

According to a third aspect the present invention provides a colour separation scanner comprising an image source mounting means, illumination means arranged to illuminate an image source mounted on the mounting means, optical separation means arranged to separate light components reflected from or transmitted through the image source into a plurality of colour components, detection means arranged to detect each of the plurality of colour components and to convert each component into an electrical colour signal, and signal processing means arranged to convert each colour signal into a compressed colour signal representing a colour separation having a printable tonal range wherein the processing means is arranged to produce two types of colour signals a first of which represents a print density range of 0–100% and is compressed by a first compression function from source image tonal densities in a range of 0.0 to 3.0 D and the second of which represents a print density range of 0–100% and is produced by applying a second function to source image tonal densities in an upper portion of the 0.0 to 3.0 D range, the second function, which produces the second type of colour signal, being complementary to that of the first compression function to reproduce tonal detail lost by the first compression function.

In the preferred embodiment the image source is scanned two or more times but other embodiments are possible in which the first and second data sets are produced simultaneously using one scan of the image source.

The colour separations prepared from the first set of data will be conventional cyan, magenta, yellow and black (CMYK) separations.

The separations prepared from the second set of data will typically be red, green and blue (RGB) although this would be dependent upon the saturated colours present in the image source and in some circumstances one or more of the red, green and blue separations may be replaced by a suitable selection of magenta, yellow and cyan separations respectively.

Preferably, a density function $f'''(d)$ of each data channel of the second set is given by $f'''(d)=f'(d)-f''(d)$ where $f'(d)$ is the desired final density function and $f''(d)$ is the density function of the corresponding separation or combination of separation from the first set.

Preferably, red or magenta separation data of the second set is processed by measuring green and blue absorbtion using the cyan channel of the scanner, the green or yellow separation data of the second set is processed by measuring red and blue absorbtion using the magenta channel of the scanner, and the blue or cyan separation data of the second set is processed by measuring red and green absorbtion using the yellow channel of the scanner.

BRIEF DESCRIPTION OF THE DRAWINGS

An embodiment of the invention will now be described, by way of example, with reference to the accompanying drawings in which.

I—a unity transfer function having an output (print) tonal density range of 0.0 to 3.0 D;

II—The compression function employed in a traditional four colour separation process; and III—A transfer function for neutral density regions with 80% under colour removal in the saturated colour areas.

Figure 4:
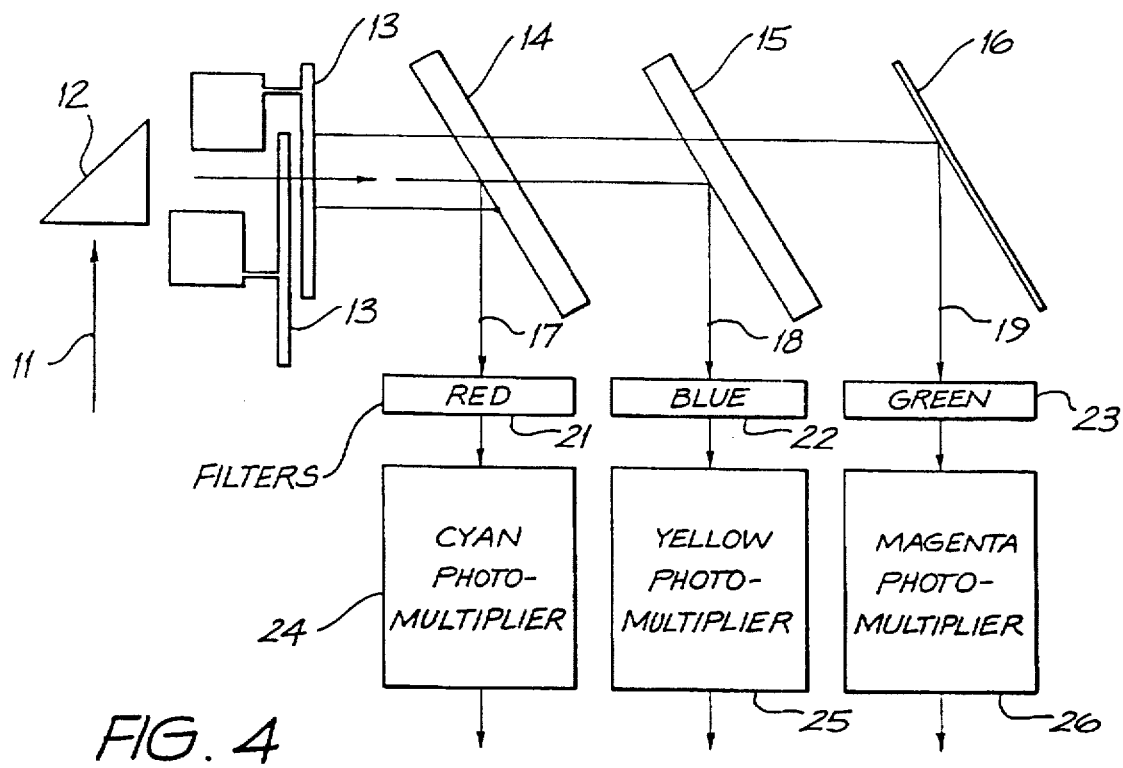

FIG. 4 schematically illustrates a dichroic assembly of a four colour separation scanner.

Figure 5:
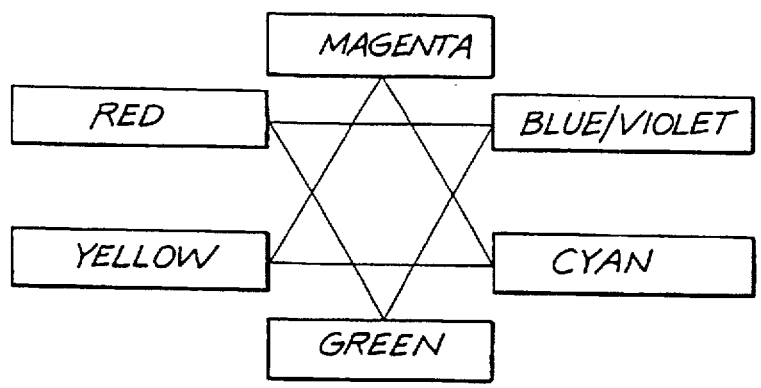

FIG. 5 diagramatically illustrates the relationship between various colours of the spectrum.

Figure 6:
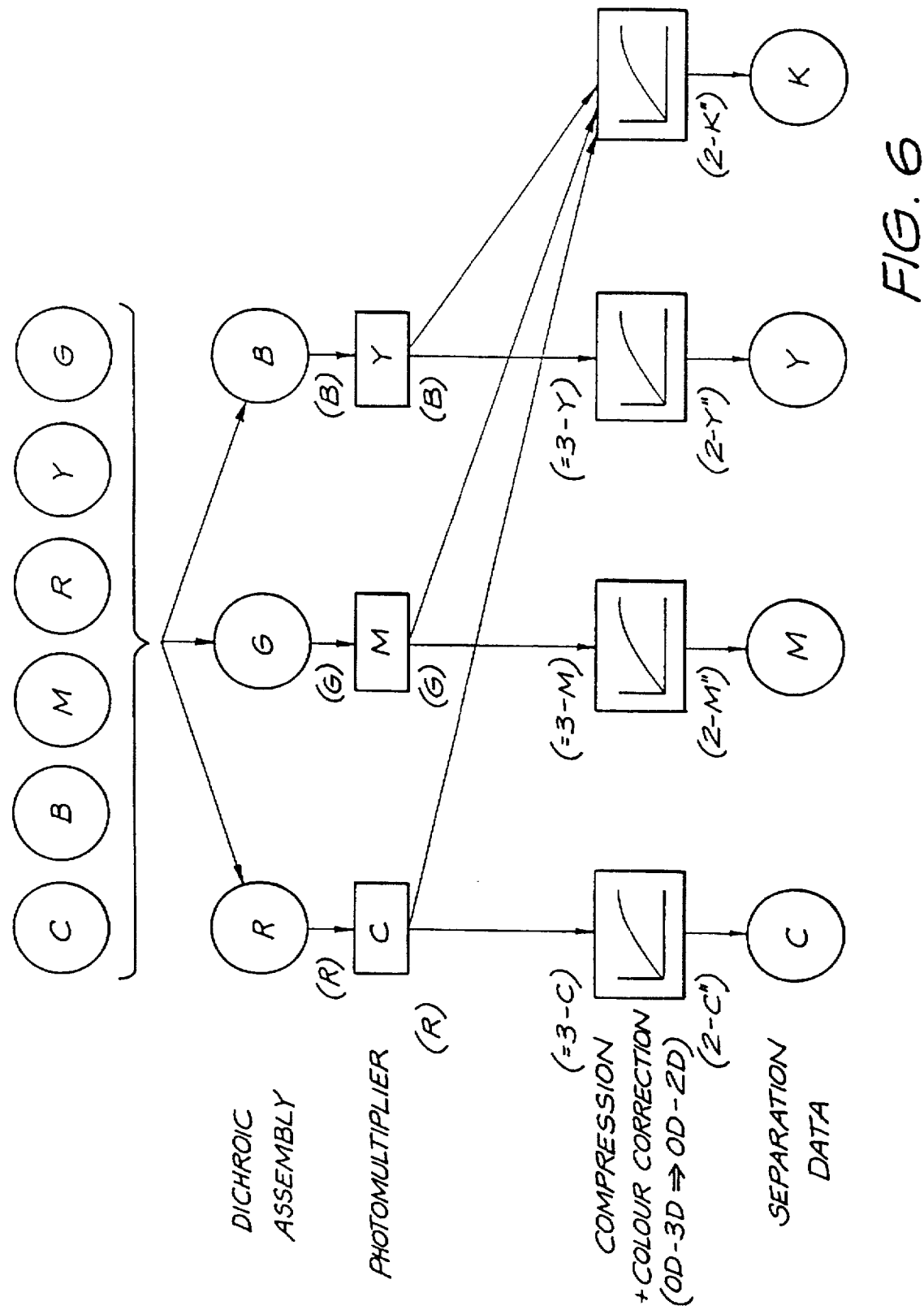
Figure 7:
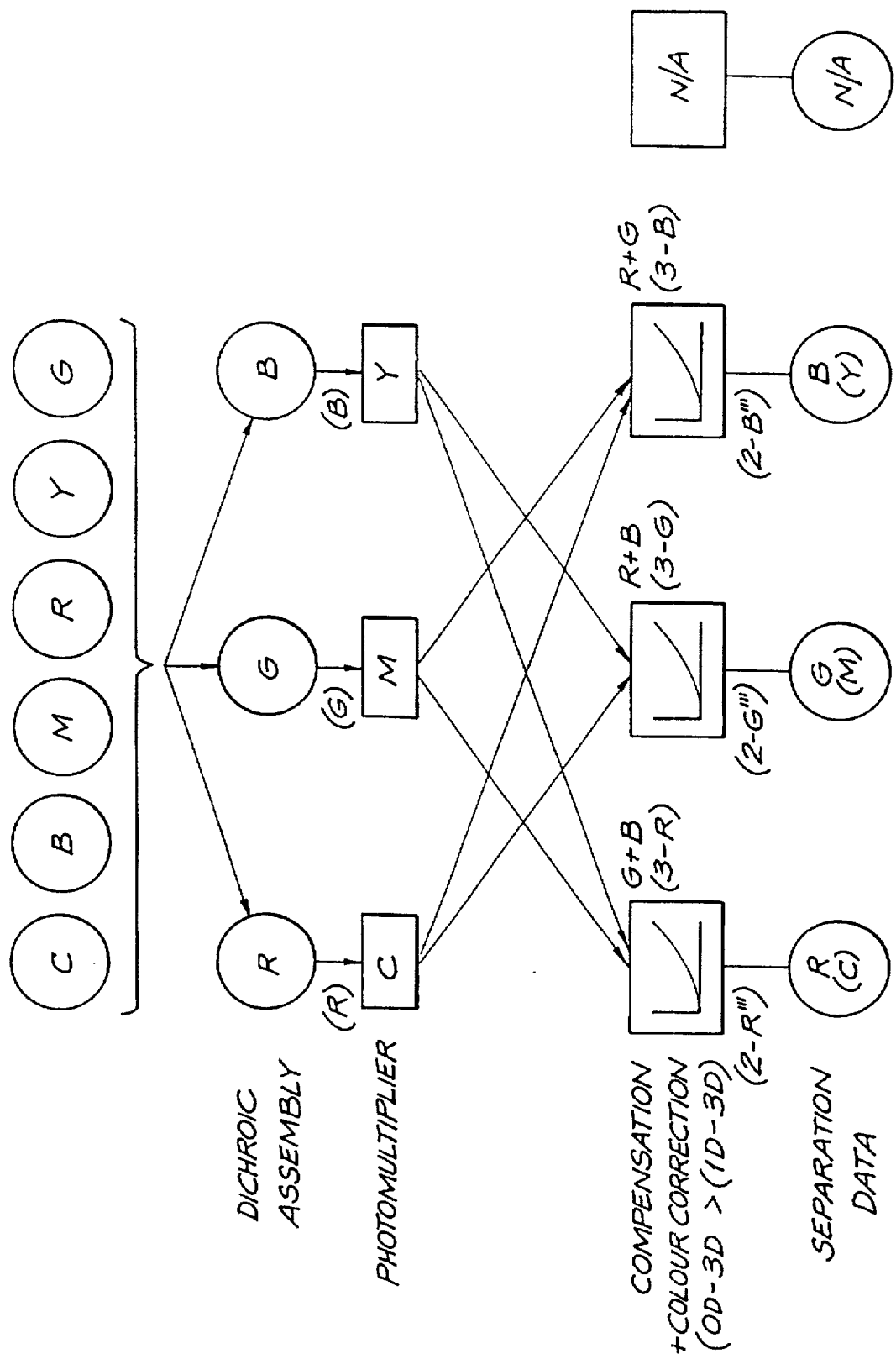

FIG. 6 diagrammatically illustrates the filtration and compression process when scanning cyan, magenta, yellow and neutral density separations in a conventional CMYK scanner;

FIG. 7 diagrammatically illustrates the filtration and compensation process when scanning red, blue and green saturation separations in a process according to the present invention.

FIG. 8 is a table showing colour correction values applicable when producing red, green and blue saturation colour separations on a Crosfield 6×6 series Magnascan scanner.

FIG. 9 is a table showing colour correction values applicable when producing magenta, yellow and cyan saturation colour separtaions on Crosfield 6×6 series Magnascan scanner.

DETAILED DESCRIPTION OF A PREFERRED EMBODIMENT

In one form of the invention, the process of the invention makes use of a second scan of the source material after the first scan is made in the traditional four colour process, the scanner channels being reprogrammed to detect saturation colour information, however, it is also possible to perform the second scan concurrently with the first if the scanner were specifically redesigned.

Typically, embodiments of the inventive process will produce special red, green and blue colour separations, from colour transparencies or reflective originals, on a conventional colour separations scanner, to compliment the existing four colour system traditionally used in the graphic arts industry. However, in some instances it will be preferable to produce additional cyan, magenta or yellow separations depending upon the predominant colours in the image source.

Four Colour Process only allows the reproduction of a limited density range between 0.0 an 2.0 D. In printing terms this equates to between 0% and 100% maximum ink on paper utilising conventional halftone screening technology.

Figure 1:
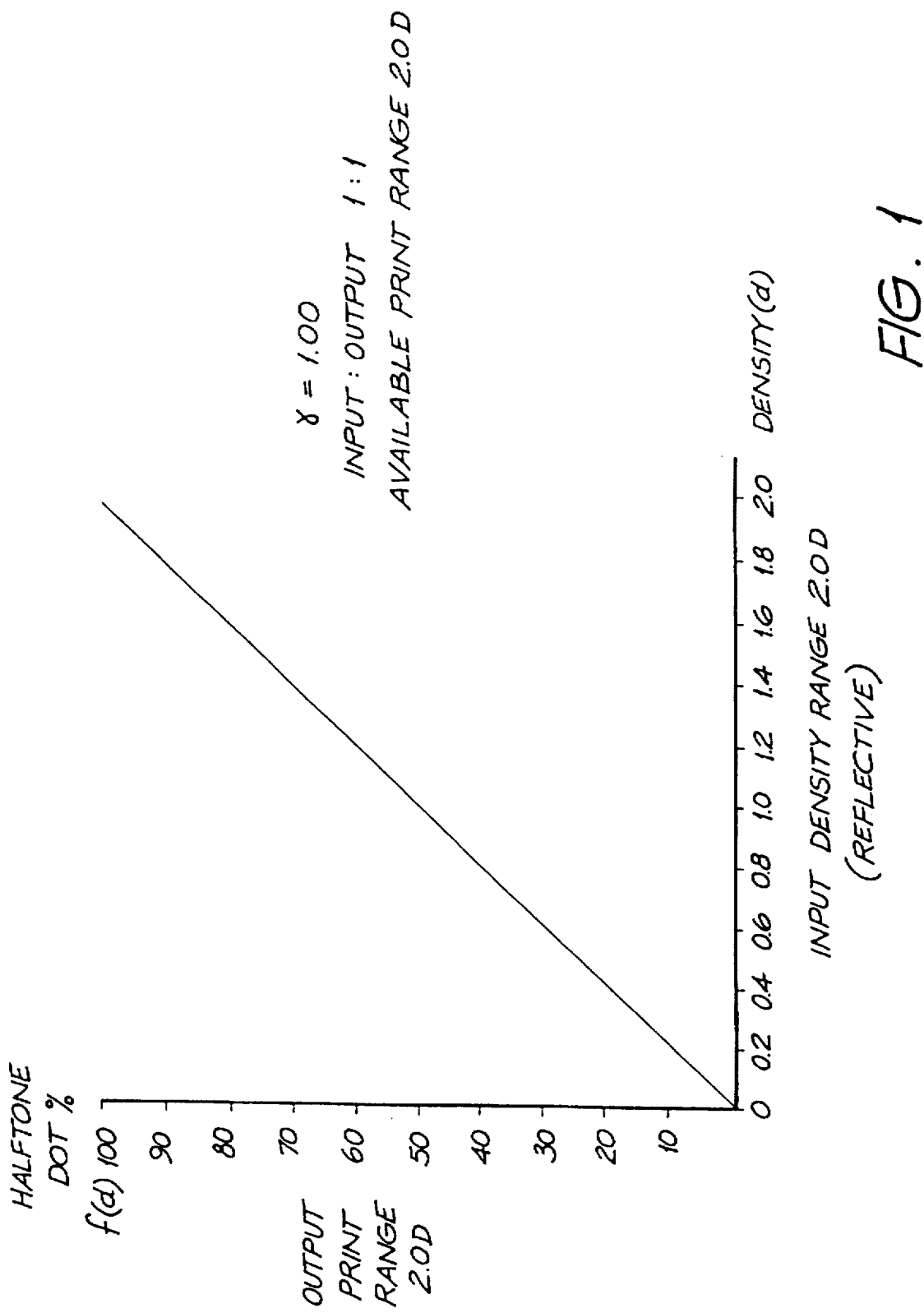
FIG. 1 graphically illustrates a density transfer function applicable to the preparation of separations having a 0.0 to 2.0 D tonal density range from a reflective source image having a 0.0 to 2.0 D tonal range.

Reflective scource material such as photographic prints typically have an average dynamic range of 2.0 D and can therefore be reproduced readily in four colour process without loss of tonal detail using a unity transfer function as illustrated in FIG. 1.

Figure 2:
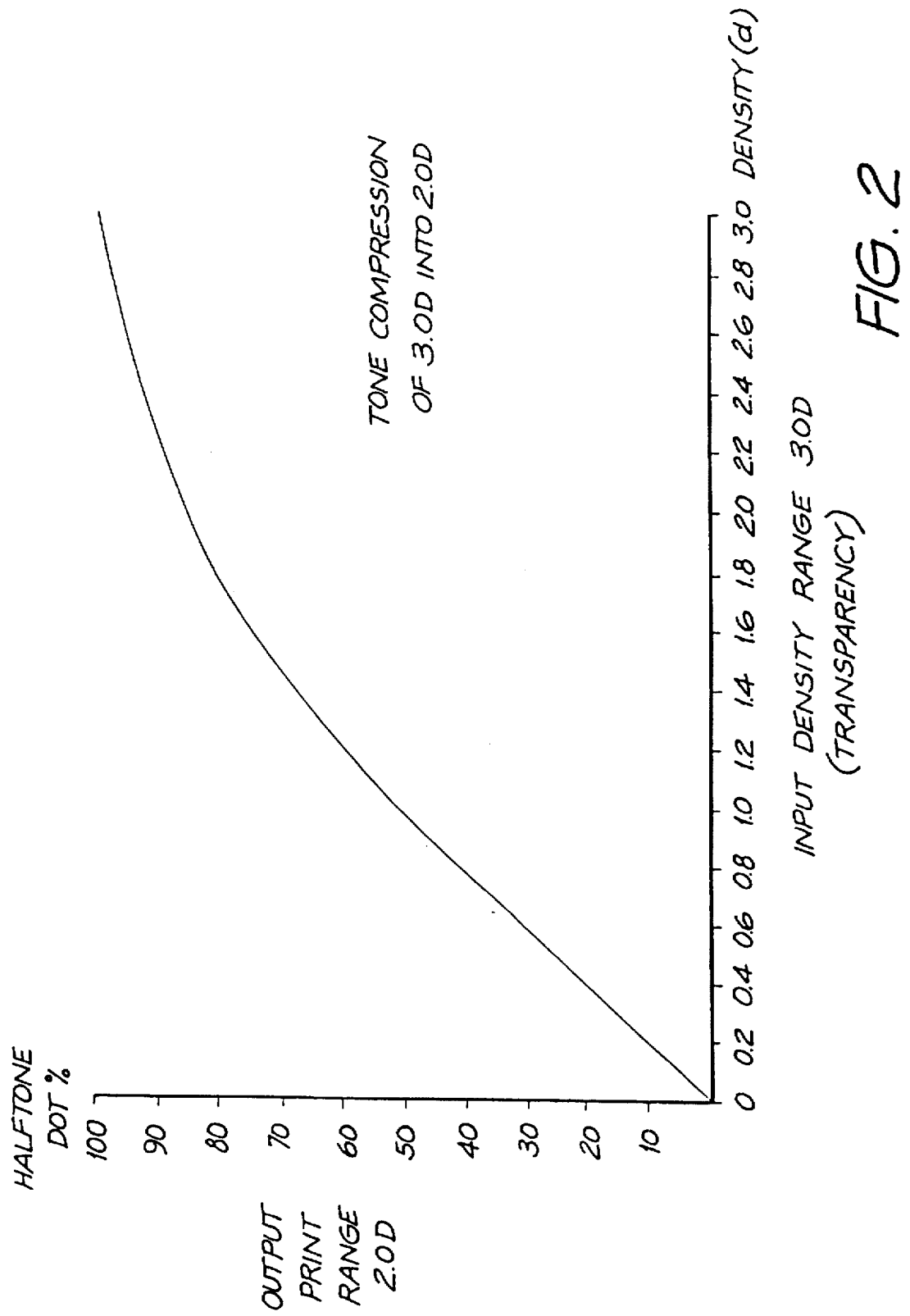
FIG. 2 graphically illustrates a compression function used in the preparation of four colour CMYK process separations having a 0.0 to 2.0 D tonal density range from a transparency having a 0.0 to 3.0 D tonal density range.
Figure 3:
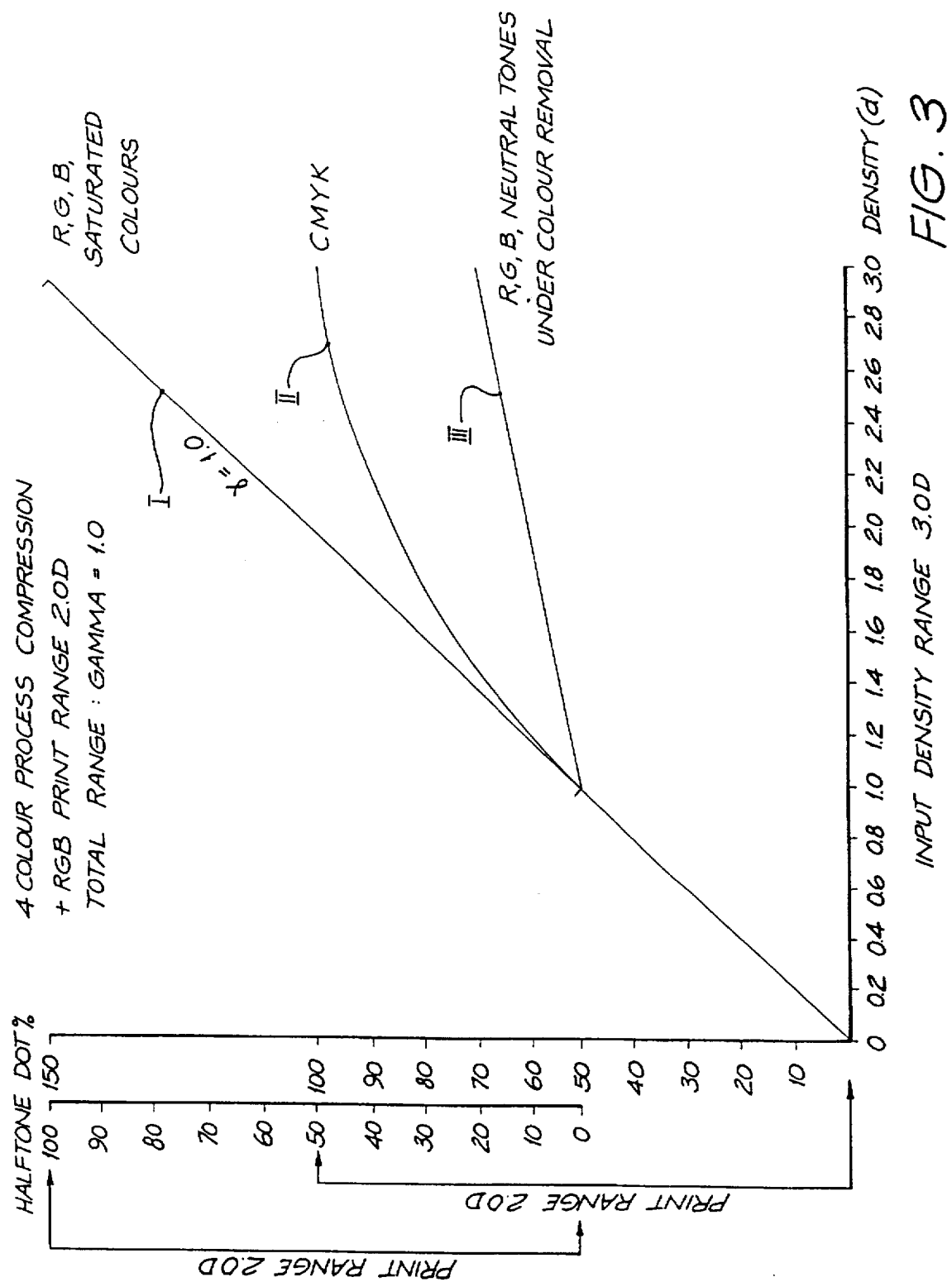
FIG. 3 graphically illustrates.

Colour transparencies however, typically have an average dynamic range of 3.0 D. Therefore the dynamic range of a transparency is greater than the print range of 2.0 D. Compensation must be made for this difference by way of tone compression to reproduce the original transparency within the limitations of the print range. The necessary tonal compression function to achieve this is illustrated in FIG. 2.

The printed result in effecting this tone compression will show loss of detail and saturation in the shadow and saturated colour regions of the original.

The saturated hues of red green and blue fall into this area and are most noticeable to the observer of the reproduction to the original.

The brighter hues of cyan, magenta and yellow do not typically create the same problem to reproduce as their transmission densities fall within the printable tone range of 0.0 to 2.0 D. On the other hand, the hues of red, green and blue can achieve densities greater than 2.0 D, hence the need to print additional red, green and blue ink to capture the saturation densities of these colours in the final printed reproduction.

In theory, using the traditional four colour process, you would need to print up to 150% ink in each colour separation to reproduce a dynamic range of 3.0 D.

In practise this cannot be achieved due to current halftone screen technology and printing inks which only allow an average print range of 2.0 D or up to 100% ink printing in each colour separation.

The addition of special red, green and blue colour separations will solve this problem by recording these colours in the density range between 1.0 and 3.0 D where normal CMYK tone compression has been applied.

This is achieved in the following method:

Step 1. Scan the original in the traditional four colour method effecting 50% polychromatic colour removal.

Step 2. A second scan must be made from the same source original to record the density range between 1.0 and 3.0 D. In practice, the function applied to the data produced by the second scan is $f'''(d)=f'(d)-f''(d)$ where $f'(d)$ is the desired tonal range of the final print image and $f''(d)$ is the compression function of the first scan. (NB: From this point on only the cyan, magenta and yellow channels on the scanner are required—the black channel is not used).

In the following description, the additional cyan, magenta and yellow separations will print red, green and blue ink respectively in the final reproduction.

The second scan is achieved by effecting the first printing tones of cyan, magenta and yellow to 0% at a preferred tonal density of 1.0 D while setting the last printing tones of 100% cyan, magenta and yellow at a preferred tonal density of 3.0 D. The print range of 2.0 D has now been moved up the tonal scale to record the input densities between 1.0 and 3.0 D.

Under Colour Removal

Under colour removal removes tonal density from the separation in areas where the source image has a neutral density component. For the saturation (second) scan apply 80% under colour removal with a starting point of 0% at 1.0 D. This will remove the unwanted neutral component from the original leaving approximately 20% colour in the neutral areas of each separation to increase saturation and definition.

Colour Correction

There are 18 colour areas which must be corrected to achieve the desired effect in the final printed result.

Using the colour correction function remove all unwanted colours from the reproduction by aligning the tonal densities in each colour area and adjusting the cyan, magenta and yellow ink percentages as shown in FIG. 8

After making the colour adjustments the scanner will be calibrated to record the ink percentage required to reproduce the red, green and blue saturation components in the source original using the cyan, magenta and yellow channels respectively.

As a standard it is preferred to print the special cyan(red) magenta(green) and yellow(blue) separations in the following Pantone colours:
CYAN=WARM RED
MAGENTA=GREEN PMS 354
YELLOW=BLUE PMS 293

An alternative colour correction arrangement is shown in FIG. 9 for a case where the second set of separtions is prepared for printing Magenta, Yellow and Cyan instead of Red, Green and Blue respectively. This is desirable when the original has a predominance of one or it is not necessary to substitute all three colours, and for example only Cyan might be substituted for Blue when the original has a predominant bright Blue sky.

Grey Balance

All grey balance is removed and the yellow and magenta separations are adjusted to be identical in dot percentage to the cyan separation.

Unsharp Masking (USM)

The unsharp masking function should be suppressed.

The result of effecting this inventive process will dramatically increase colour saturation and contrast in the final printed product.

The scanner can be programmed to carry out these steps using colour correction tables as reference. The programming of the tables can be modified as required.

To assist in understanding the working of the invention, the operation of dichroic filters in a dichroic assembly of a standard four colour separator will be described with reference to FIG. 4 of the drawings.

In a conventional colour separation scanner, the image source is illuminated from above or behind depending upon whether a reflection source or transparency is being scanned. A scanning head is then systematically moved over the image source to measure in turn the light 11 emitting from each point on the surface of the image source.

The beam of the light 11 emitted from the image source is then reflected through a series of mirrors until it reaches the dichroic assembly of FIG. 4. Entry into the dichroic assembly is via a mirrored prism 12 which directs the beam 11 through balancing filters 13 and onto a series of coated dichroic mirrors 14,15, which selectively reflect one colour and pass the others. In this manner, a red light component 17 is reflected by a first dichroic mirror 14, a blue light component 18 is reflected by a second dichroic mirror 15 and a green light reflected by a second dichroic mirror 15 and a green light component 19 is reflected by a final conventional mirror 16. The red, blue and green light components 17,18,19 are then filtered through red green and blue separation filters 21,22,23 before striking photomultipliers for the Cyan channel 24, the Yellow channel 25 and the Magenta channel 26.

The photomultipliers measure the intensity of light striking them and convert this into an electrical signal which is then digitized and processed by a programme running on a microprocessor.

The Cyan photomultiplier 24 measures the intensity of red light emitted from the source image and the inverse of this signal is therefore a measure of the red light absorbed by Cyan (Blue and Green) pigment in the source. Similarly, the Yellow multiplier 25 measures the intensity of Blue light reflected or Yellow (Red and Green) light absorbed and the Magenta photomultiplier 16 measures the intensity of Green light reflected or Magenta (Red and Blue) light absorbed. The relationship between reflected/absorbed colours in the spectrum is illustrated in FIG. 5.

FIG. 6 diagramatically illustrates the light and signal processing performed in a conventional separation scanner. In this diagram, polychromatic light is reflected from or transmitted through the source and processed by the dichroic assembly to obtain red blue and green light components.

The red blue and green components are then measured by cyan magenta and yellow channel photomultipliers to produce cyan, magenta, yellow and black signals. It should be noted that these signals actually represent the data required to produce cyan, magenta, yellow and black negatives and therefore signal inversion does not actually take place at this point. A compression function f"(d) is then applied to each channel to reduce the dynamic range of each signal to fall within the printable range of 2 D, and these compressed signals are then used as exposure signals to produce four separation negatives, for Cyan, Magenta, Yellow and Black print separations. It will be noted that black is printed when red, green and blue are all absent (ie cyan, magenta and yellow are all present) and density is electronically removed from the cyan, magenta and yellow separations in proportion to the density added to the black separation. The proportion of density moved to the black separation is controllable by the operator of the scanner and is called under colour removal.

Turning to FIG. 7, a similar diagram to that of FIG. 6 is provided to show the processing steps required in a conventional scanner to produce three saturation separations for printing red, green and blue ink.

As with FIG. 6, the dichroic assembly separates red, green and blue light components emitted from the source and these are measured by the cyan, magenta and yellow channel photomultipliers. The output signals from the photomultipliers are then processed to determine the red, green and blue saturation components as follows:

Red component—coupled detection of the blue and green (cyan) absorption through the cyan channel;

Blue component—coupled detection of the red and green (yellow) absorption through the yellow channel;

Green component —coupled detection of the red and blue (magenta) absorption through the magenta channel;

These signals are then compensated to counteract the compression function applied to the first (CMYK) scan. By measuring absorption of the complementary colour rather than transmission of the colour of interest, an inversion is automatically included in this processing, as indicated by the −f'(d) component, to cancel the inversion which takes place in the production of the separation negative.

To aid in illustrating a preferred embodiment of the invention, the following tables set out an example of technical data required to produce special red, green and blue colour separations on any Crosfield Magnascan 6×6 series scanner.

Table 1

CAL 130 Recall full block "0"

Table 2

Density Range 2.0 D
CAL 28 1.0 Yellow
    1.0 Magenta
    1.0 Cyan
Manual enter white cyan 0%
CAL 29 3.0 Yellow
    3.0 Magenta
    3.0 Cyan
Manual enter black cyan 100%

Table 3

Grey Balance
CAL 13 cyan=magenta=yellow

STEPS:
2/5%, 3/10%, 4/15%, 5/20%, 6/25%, 7/30%, 8/40%
9/50%, 10/60%, 11/70%, 12/80%, 13/85%, 14/90%,
15/95%

Table 4

Colour Correction
CAL 12
STEPS:
1/−2.00, 2/−2.00, 3/−2.00, 4/0.00, 5/+1.20, 6/0.00, 7/−2.00,
8/0.00, 9/+1.20, 10/0.00, 11/−2.00, 12/−1.00, 13/+1.20, 14/−1.00, 15/−2.00, 16/−1.00, 17/−2.00, 18/0.00.

Steps 19 through 24 set to 0.0.

Table 5

Under Colour Removal
CAL 515
Breakpoint—0
Slope—0.20

Table 6

Unsharp Masking (USM)
Sharp—0
Smooth—0

Table 7

Black Printer
CAL 11
Offset—+2.0
Slope—0.0
ALL OTHER DATA REMAINS UNCHANGED IN THE VERSION 9.0 SOFTWARE It will be apparent that changes in, and modifications to the invention may be made without departing from the spirit and scope thereof.

I claim:

1. A method of producing colour separations for a print process wherein an image source is scanned one or more times to produce a plurality of data channels each of which provides a representation of one colour separation of the image source, the data provided by each channel being restricted to represent a printable tone density range, and the channels being separated into two groups, a first providing separation data representing a base image and comprising a compressed representation of the density range of the image source, and the second providing separation data representing a saturation image and substantially comprising a representation of the density range data lost from the first data set as a result of compression to a printable density range.

2. The method of claim 1 wherein the image source is scanned once and the plurality of data channels are simultaneously produced.

3. The method of claim 1 wherein the image source is scanned two or more times.

4. The method of claim 1 wherein the first data set represents cyan, magenta, yellow and black colour separations.

5. The method of claim 1 wherein the second data set represents red, green and blue colour separations.

6. The method of claim 1 wherein the second data set represents one or more colour separations selected from red, green, blue, cyan, magenta and yellow colour separations.

7. The method of claim 1 wherein a density function f'''(d) of each data channel of the second set is given by f'''(d)=f'(d)−f''(d) where f'(d) is the desired final density function and f''(d) is the density function of the corresponding separation or combination of separations from the first set.

8. The method of claim 1 wherein red or magenta separation data of the second set is processed by measuring green and blue absorption using the cyan channel of the scanner, the green or yellow separation data of the second set is processd by measuring red and blue absorption using the magenta channel of the scanner, and the blue or cyan separation data of the second set is processed by measuring red and green absorption using the yellow channel of the scanner.

9. A method of producing colour separations for a print process comprising the steps of:
(a) scanning an image source with a scanner having a conventional set of scanning parameters to produce data representing a first set of colour separations of the image, each having a printable density range, the separations being capable of reproducing the image with a tone density range within a printable density range;
(b) reprogramming the scanner to alter the scanning parameters to identify saturated colours in the image source;
(c) scanning the image source to produce a second set of data representing a second set of colour separations of the image also having a printable density range and carrying saturation colour information not recorded in the first set of data; and
(d) preparing a set of colour separations from the first and second sets of data.

10. The method of claim 9 wherein the first data set represents cyan, magenta, yellow and black colour separations.

11. The method of claim 9 wherein the second data set represents red, green and blue colour separations.

12. The method of claim 9 wherein the second data set represents one or more colour separations selected from red, green, blue, cyan, magenta and yellow colour separations.

13. The method of claim 9 wherein a density function f'''(d) of each data channel of the second set is given by f'''(d)=f'(d)−f''(d) where f'(d) is the desired final density function and f''(d) is the density function of the corresponding separation or combination of separations from the first set.

14. The method of claim 9 wherein red or magenta separation data of the second set is processed by measuring green and blue absorption using the cyan channel of the scanner, the green or yellow separation data of the second set is processd by measuring red and blue absorption using the magenta channel of the scanner, and the blue or cyan separation data of the second set is processed by measuring red and green absorption using the yellow channel of the scanner.

15. A colour separation scanner comprising an optical separation means arranged to separate light components emitted from an image, detection means arranged to detect each of the plurality of colour components and to convert each component into an electrical colour signal, and signal processing means arranged to convert each colour signal into a compressed colour signal representing a colour separation having a printable tonal range wherein the processing means is arranged to produce two types of colour signals a first of which represents a print density range of 0–100% and is compressed by a first compression function from source image tonal densities in the range 0.0 to 3.0 D and the second of which represents a print density range of 0–100% and is produced by applying a second function to source image tonal densities in an upper portion of the 0.0 to 3.0 D range, the second function, which produces the second type of colour signal being complementary to that of the first compression function to substantially reproduce tonal detail lost by the first compression function.

16. The colour separation scanner of claim 15 wherein the first and second signal types are generated in a single scan of the source image.

17. The colour separation scanner of claim 15 wherein the first and second signal types are generated in separate scans of the source image.

18. The colour separation scanner of claim 15 wherein the signals of the first signal type represents cyan, magenta, yellow and black colour separations.

19. The colour separation scanner of claim 15 wherein the signals of the second signal type represent red, green and blue colour separations.

20. The colour separation scanner of claim 15 wherein the signals of the second signal type represent one or more colour separations selected from red, green, blue, cyan, magenta and yellow colour separations.

21. The colour separation scanner of claim 15 wherein the tonal density compression function $f'''(d)$ of each colour signal of the second type is given by $f'''(d)=f(d)-f''(d)$ where d is the density of the source image, $f(d)$ is the desired tonal density function of a final printed image for a colour and $f''(d)$ is the tonal density compression function of signals of the first type for the colour separation or combination of colour separations producing the respective colour in the final printed image.

22. The colour separation scanner of claim 15 wherein red or magenta separation data of the second set is processed by measuring green and blue absorption using the cyan channel of the scanner, the green or yellow separation data of the second set is processed by measuring red and blue absorption using the magenta channel of the scanner, and the blue or cyan separation data of the second set is processed by measuring red and green absorption using the yellow channel of the scanner.

23. A method of producing print by means which utilizes colour separations produced by a method wherein an image source is scanned one or more times to produce a plurality of data channels each of which provides a representation of one colour separation of the image source, the data provided by each channel being restricted to represent a printable tone density range, and the channels being separated into two groups, a first providing separation data representing a base image and comprising a compressed representation of the density range of the image source, and the second providing separation data representing a saturation image and substantially comprising a representation of the density range data lost from the first data set as a result of compression to a printable density range.

24. Print produced by a method which utilizes colour separations produced by a method wherein an image source is scanned one or more times to produce a plurality of data channels each of which provides a representation of one colour separation of the image source, the data provided by each channel being restricted to represent a printable tone density range, and the channels being separated into two groups, a first providing separation data representing a base image and comprising a compressed representation of the density range of the image source, and the second providing separation data representing a saturation image and substantially comprising a representation of the density range data lost from the first data set as a result of compression to a printable density range.

* * * * *